United States Patent
Andersson Reimer et al.

(10) Patent No.: US 9,256,351 B2
(45) Date of Patent: Feb. 9, 2016

(54) METHOD AND ELECTRONIC DEVICE FOR FACILITATING USER CONTROL OF A MENU

(75) Inventors: Nils Roger Andersson Reimer, Malmö (SE); Simon Martin Thorsander, Eslöv (SE); Robert Simon Lessing, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 202 days.

(21) Appl. No.: 13/554,784

(22) Filed: Jul. 20, 2012

(65) Prior Publication Data

US 2014/0026099 A1  Jan. 23, 2014

(51) Int. Cl.
*G06F 3/0482* (2013.01)
*G06F 3/0488* (2013.01)
*G06F 9/44* (2006.01)

(52) U.S. Cl.
CPC .......... *G06F 3/0482* (2013.01); *G06F 3/04883* (2013.01)

(58) Field of Classification Search
CPC .............................. G06F 3/0482; G06F 9/4446
USPC ......................................................... 715/825
See application file for complete search history.

(56) References Cited

U.S. PATENT DOCUMENTS

| | | | |
|---|---|---|---|
| 5,592,605 A * | 1/1997 | Asuma et al. .................. | 715/775 |
| 5,995,101 A * | 11/1999 | Clark et al. ................... | 715/711 |
| 6,816,174 B2 * | 11/2004 | Tiongson et al. ............. | 715/787 |
| 7,263,668 B1 | 8/2007 | Lentz | |
| 8,707,212 B2 * | 4/2014 | Ogren ........................... | 715/841 |
| 2004/0095372 A1 * | 5/2004 | Berry et al. .................... | 345/713 |
| 2004/0233316 A1 * | 11/2004 | Battles et al. ............. | 348/333.02 |
| 2005/0091609 A1 * | 4/2005 | Matthews ............. | G06F 3/0482 715/804 |
| 2005/0273778 A1 * | 12/2005 | Bixler ................... | G06F 9/4446 717/165 |
| 2006/0123360 A1 * | 6/2006 | Anwar et al. .................. | 715/810 |
| 2007/0061723 A1 * | 3/2007 | Ohga et al. .................... | 715/705 |
| 2007/0168890 A1 * | 7/2007 | Zhao et al. ..................... | 715/863 |
| 2007/0250793 A1 * | 10/2007 | Miura et al. ................... | 715/810 |
| 2008/0048973 A1 | 2/2008 | McKay | |
| 2008/0201637 A1 * | 8/2008 | Shirasaki ....................... | 715/705 |
| 2009/0271702 A1 * | 10/2009 | Bamford ............... | G06F 3/0488 715/702 |
| 2009/0276702 A1 * | 11/2009 | Bamford ............... | G06F 3/0488 715/702 |

(Continued)

FOREIGN PATENT DOCUMENTS

EP   2375307    10/2011
WO   2004/017227   2/2004

OTHER PUBLICATIONS

Michael Zuschlag Menu Bank Shot Feb. 1, 2009 6 pages.*

(Continued)

*Primary Examiner* — Andrea Long
(74) *Attorney, Agent, or Firm* — Fish & Richardson P.C.

(57) ABSTRACT

An electronic device comprising a display and means for receiving user input, a method of operation thereof and computer software, the method comprising, while receiving a first user input, displaying a menu in a first configuration, the menu in a first configuration having one or more menu elements; and on receiving a second user input continuous from the first user input, displaying the menu in a second configuration, wherein at least one element of the menu in a first configuration is represented in the menu in a second configuration.

27 Claims, 9 Drawing Sheets

(56) References Cited

U.S. PATENT DOCUMENTS

| | | | | |
|---|---|---|---|---|
| 2009/0295753 | A1* | 12/2009 | King et al. | 345/174 |
| 2010/0211638 | A1* | 8/2010 | Rougier | 709/205 |
| 2011/0158125 | A1* | 6/2011 | Haaparanta | 370/254 |
| 2011/0202879 | A1* | 8/2011 | Stovicek et al. | 715/828 |
| 2011/0209097 | A1* | 8/2011 | Hinckley et al. | 715/863 |
| 2011/0300910 | A1* | 12/2011 | Choi | 455/566 |
| 2012/0036471 | A1 | 2/2012 | Swanson et al. | |
| 2012/0099129 | A1* | 4/2012 | Ogino et al. | 358/1.13 |
| 2013/0019174 | A1* | 1/2013 | Gil et al. | 715/711 |
| 2013/0019182 | A1* | 1/2013 | Gil | G06F 3/0482 715/738 |

OTHER PUBLICATIONS

Marti Hearst Modern Information Retrieval Chapter 10: User Interfaces and Visualization 1999 4 pages.*

R.J.K. Jacob, "User Interfaces," in Encyclopedia of Computer Science, Fourth Edition, ed. by A. Ralston, E.D. Reilly, and D. Hemmendinger, Grove Dictionaries Inc., 2000.*

Roudaut, A., Bailly, G., Lecolinet, E., & Nigay, L. (2009). Leaf menus: Linear menus with stroke shortcuts for small handheld devices. In T. Gross et al. (Eds.), Human-computer interaction—interact 2009(vol. 5726, pp. 616-619). Berlin, Heidelberg: Springer.*

Paul Boutin Accelerate Android With Tips and Tricks Jun. 22, 2011 9 pages.*

Google updates Gmail app for android—BWOne.com YouTube video uploaded Sep. 21, 2010 https://www.youtube.com/watch?v=ykDbDICG6XY.*

European Patent Office, "Extended European Search Report," issued in connection with application No. EP 12177389.9, on Nov. 8, 2012, 6 pages.

Wikipedia, "Taskbar," Jul. 12, 2012, retrieved from the internet at http://en.wikipedia.org/w/index.php?title=Taskbar&oldid=501834124, accessed on Aug. 22, 2014, 8 pages—cited in "Extended European Search Report," issued in connection with application No. EP 12177389.9, on Nov. 8, 2012.

Response to the Extended European Search Report, filed with the European Patent Office in connection with application No. EP 12177389.9, on Jul. 22, 2014, 10 pages.

* cited by examiner

METHOD AND ELECTRONIC DEVICE FOR FACILITATING USER CONTROL OF A MENU

FIELD OF THE TECHNOLOGY

The present disclosure relates to electronic devices, methods of operation thereof, and computer software for facilitating user control the device. In particular, the present disclosure provides user interfaces that facilitate user control of a menu of a user interface of the device.

BACKGROUND

Electronic devices are in many cases provided with one or more displays for providing visual information to users of the devices. The electronic devices can be provided with user interfaces for display on the display of the device for facilitating user interaction with, and operation of, the device via one or more user inputs. The user interfaces comprise visual elements that can be arranged in various manners on the screen and can represent, for example, executable software programs, menus including selectable menu elements indicating for example functionality or operations available to the user within programs, a state of some aspect of program or data or other function of the device, etc. User inputs such as trackpads, trackballs, mice, cursors, touch screens and multitouch screens, can provide pointer-type controls usable to adjust the position of a pointer in multiple dimensions to allow interaction with the user interface by, for example, enabling navigation through a menu, options, file systems, program shortcuts etc, and enabling selection and manipulation of visual elements and the items they represent, such as by providing user inputs to the device e.g. by using a touch-sensitive screen.

It is preferable for user interfaces to be simple enough to be intuitive to new users, while still allowing a user to perform complex actions quickly. Furthermore, with a finite amount of screen real estate available on displays for electronic devices, it is preferable for user interfaces to be able to perform their function while minimising the amount of screen space used that could otherwise be utilised for displaying content.

BRIEF DESCRIPTION OF DRAWINGS

Examples of the present proposed approach will now be described in detail with reference to the accompanying drawings, in which.

DETAILED DESCRIPTION

Figure 1:
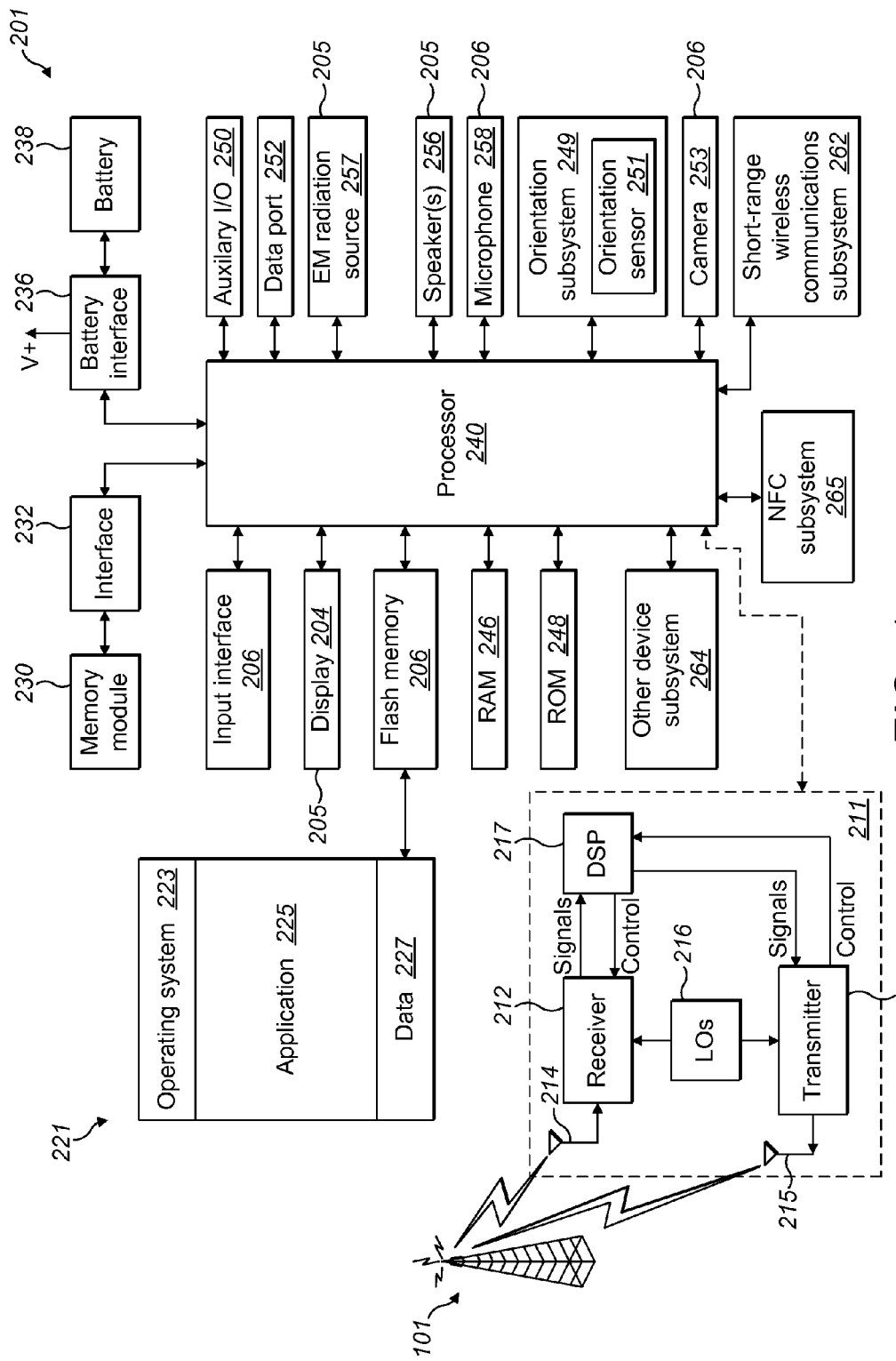
FIG. 1 is a block diagram illustrating an electronic device in accordance with example embodiments of the present disclosure.

In one embodiment, the present disclosure provides a method, at an electronic device comprising a display and means for receiving user input, the method comprising, while receiving a first user input, displaying a menu in a first configuration, the menu in a first configuration having one or more menu elements; and on receiving a second user input continuous from the first user input, displaying the menu in a second configuration, wherein at least one element of the menu in the first configuration is represented in the menu in the second configuration.

This embodiment describes a menu that is displayed in a first configuration in response to a first user input. If a second user input is received continuous from the first user input, the menu is displayed in a different, second configuration. By providing these two configurations based on whether or not a second user input has been received continuous from the first user input, a user is provided with functionality to quickly and intuitive display a menu in either of a first and second configuration.

It can be beneficial to have two menu configurations easily available to a user. For example, both a novice and experienced user may use the same application, but the novice user may wish to access a larger, easier to understand menu, whereas the experienced user may wish to access a menu that can be interacted with quickly. The two menu configurations may provide the same functionality or operations, but may have different design objectives, for example speed versus ease of use. In this system, users having different levels of experience can use the same software, but can operate it in the way they find the most intuitive and useful. The menu in a first configuration may be designed for experienced users as it may be accessed quickly by performing only the first user input, whereas the menu in a second configuration may be designed for less experienced users where they perform the more deliberate action of first user input and second user input.

Both menu configurations require a common, first user input to be received. This ensures that a novice user who usually interacts with a menu in one configuration by performing first and second continuous user inputs, only has to alter their usual interaction slightly (i.e. by not performing the second continuous user input) to begin interacting with the menu in a different, more advanced configuration when he is ready. By providing a common user input for both menus may allow a user to more easily determine that the two menu configurations are provided, for example, for different modes of interaction.

In some example embodiments, the first user input is directed to an icon displayed on the display.

In some example embodiments, at least one of the one or more menu elements are selectable to carry out an operation.

In some example embodiments, the operation is performed in relation to an application having a graphical user interface displayed on the display.

In some example embodiments, the menu in a first configuration is displayed once a first user input has been received for longer than a predetermined threshold. This threshold may be advantageous, as where a user provides a first user input followed very quickly by a second user input, it is unlikely they wish to see the menu in a first configuration as their actions indicate that they wish to view the menu in the second configuration.

In some example embodiments, the menu elements in the menu in a first configuration consist of representative icons of operations associated with the menu elements.

In some example embodiments, the menu elements in the menu in a second configuration comprise descriptions of operations associated with the menu elements.

In some example embodiments, the menu in a first configuration is smaller than the menu in a second configuration. By displaying the menu in a relatively small configuration in response to the 'expert' interaction such as providing a first user input alone, the area of the screen real estate which the menu takes up is kept small and user interaction with the menu is enabled without having part of the screen obscured unnecessarily. This can further facilitate user interaction with the device and avoid user frustration. However, also providing the menu in a second, larger configuration can be beneficial to a novice user for whom screen real estate can to a degree be sacrificed for greater ease of use through being provided with a large menu with more information.

In some example embodiments, the menu in at least one of the configurations is displayed projecting from said icon displayed on the display. By showing the menu projecting from the icon indicates to the user that the menu is a result of the user's user input directed to the icon.

In some example embodiments, the menu in at least one of the configurations is scrollable to display additional menu elements in response to receipt of user input.

In some example embodiments, while the menu in a first configuration is displayed, further comprising receiving a user input selecting one of said menu elements and carrying out the operation associated with said menu element.

In some example embodiments, the user input selecting one of said menu elements is continuous from the first user input. This may be advantageous as a user may initiate the menu and select one of the menu elements in one continuous movement in the form a selecting user input continuous from the first user input. This may provide the user with a quick way of interacting with the menu without having to perform separate, discrete user inputs. In other words, this may require fewer user interactions.

In some example embodiments, the user input selecting one of said menu elements is a press and release on the menu element.

In some example embodiments, upon receiving the user input selecting one of said menu elements, displaying an indication that the selected menu element has been selected.

In some example embodiments, the method further comprises receiving a user input directed to one of said menu elements and displaying said menu element in an expanded form.

In some example embodiments, the first user input is an operational selection.

In some example embodiments, the first user input is a press.

In some example embodiments, the second user input is an operational unselection.

In some example embodiments, the second user input is a release. By configuring the menu to be displayed in a second configuration on a release may help to ensure that a user's touch actually corresponds with their intended target. This is because a release is a more deliberate move of selection (as opposed to another type of control i.e. scroll, swipe, or pinch-zoom gesture) as it requires two successive actions: a touch, press or hover—on and a release or retraction. This is advantageous for new users or users unfamiliar with the user interface as the menu in the second configuration is then displayed to allow the user to choose which menu element to select (by enabling further, for example separate, user input).

In some example embodiments, the first and second user inputs are directed to the same location of the display.

In some example embodiments, the second user input is a release on said icon displayed on the display.

In some example embodiments, the second user input is the converse of the first user input.

In some example embodiments, the second user input is a movement of the press away from the menu e.g. a swipe gesture or scrolling action.

In some example embodiments, the method further comprises receiving an intermediate user input continuous from the first user input and continuous to the second user input. This may be advantageous as the user may perform other, intermediate user inputs before deciding to provide the second user input to initiate the menu in a second configuration, all within the same continuous movement.

In some example embodiments, the electronic device comprises a touch sensitive display and wherein said user inputs are performed in relation to said touch sensitive display.

In another embodiment, the present disclosure provides an electronic device comprising: a display; means for receiving user input; one or more processors; and memory comprising instructions which when executed by one or more of the processors cause the device to while receiving a first user input, displaying a menu in a first configuration, the menu in a first configuration having one or more menu elements; and on receiving a second user input continuous from the first user input, displaying the menu in a second configuration, wherein at least one element of the menu in a first configuration is represented in the menu in a second configuration.

In some example embodiments, the means for receiving user input comprises a touch sensitive display.

In another embodiment, the present disclosure provides a computer readable medium comprising instructions which when executed by one or more processors of an electronic device having a display and means for receiving user input; one or more processors; and memory comprising instructions which when executed by one or more of the processors cause the device to while receiving a first user input, displaying a menu in a first configuration, the menu in a first configuration having one or more menu elements; and on receiving a second user input continuous from the first user input, displaying the menu in a second configuration, wherein at least one element of the menu in a first configuration is represented in the menu in a second configuration.

Reference will now be made to FIG. 1 which illustrates an electronic device 201 in which example embodiments described in the present disclosure can be applied.

In the illustrated example embodiment, the electronic device 201 is a communication device and, more particularly, is a mobile communication device having data and voice communication capabilities, and the capability to communicate with other computer systems; for example, via the Internet.

Depending on the functionality provided by the electronic device 201, in various example embodiments the electronic device 201 may be a multiple-mode communication device configured for both data and voice communication, a mobile telephone, such as a phone, a wearable computer such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processors 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

As noted above, in some example embodiments, the electronic device 201 may include a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate. The wireless network 101 may, for example, be a cellular (such as GSM, GPRS, CDMA and EDGE) and/or a non-cellular network (for example local WiFi networks).

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (ND) conversion. ND conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

In at least some example embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 may, in some example embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such a user interface (UI) module. In the example embodiment of FIG. 1, the UI module is implemented as a stand-alone application 225. However, in other example embodiments, the UI module could be implemented as part of the operating system 223 or another application 225 or collection of applications.

The UI module may be provided as a computer software product. The computer software product may be provided in, on or supported by a computer readable medium which could be provided as all possible permanent and non-permanent forms of computer readable medium either transitory in nature, such as in a data transmission signal for example sent over the internet, or non-transitory in nature such as in the RAM 246 of the device 201 or other, non-volatile storage such as memory 230. On the other hand the computer readable medium may be a non-transitory computer readable medium comprising all computer-readable media, with the sole exception being a transitory, propagating signal.

Figure 2:
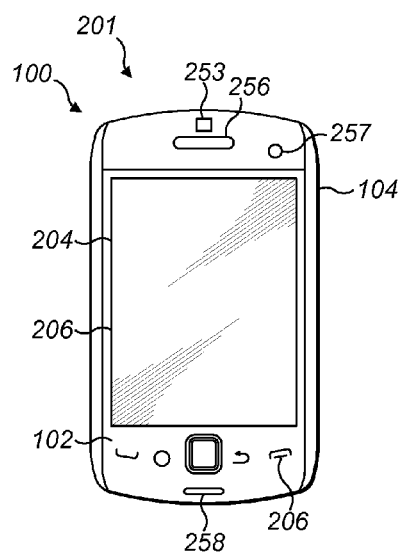
FIG. 2 is a front view of a phone in accordance with example embodiments of the present disclosure.

Referring now to FIG. 2, the electronic device 201 could be a cellular (or mobile) phone 100. For example, the phone 100 may have the ability to run third party applications which are stored on the phone.

The phone 100 may include the components discussed above with reference to FIG. 1 or a subset of those components. The phone 100 includes a housing 104 which houses at least some of the components discussed above with reference to FIG. 1.

In the example embodiment illustrated, the phone includes a display 204, which may be a touchscreen display which acts as an input interface 206. The display 204 is disposed within the phone 100 so that it is viewable at a front side 102 of the phone 100. That is, a viewable side of the display 204 is disposed on the front side 102 of the phone. In the example embodiment illustrated, the display 204 is framed by the housing 104.

The example phone 100 also includes other input interfaces 206 such as one or more buttons, keys or navigational input mechanisms. In the example illustrated, at least some of these additional input interfaces 206 are disposed for actuation at a front side 102 of the phone.

Figure 3:
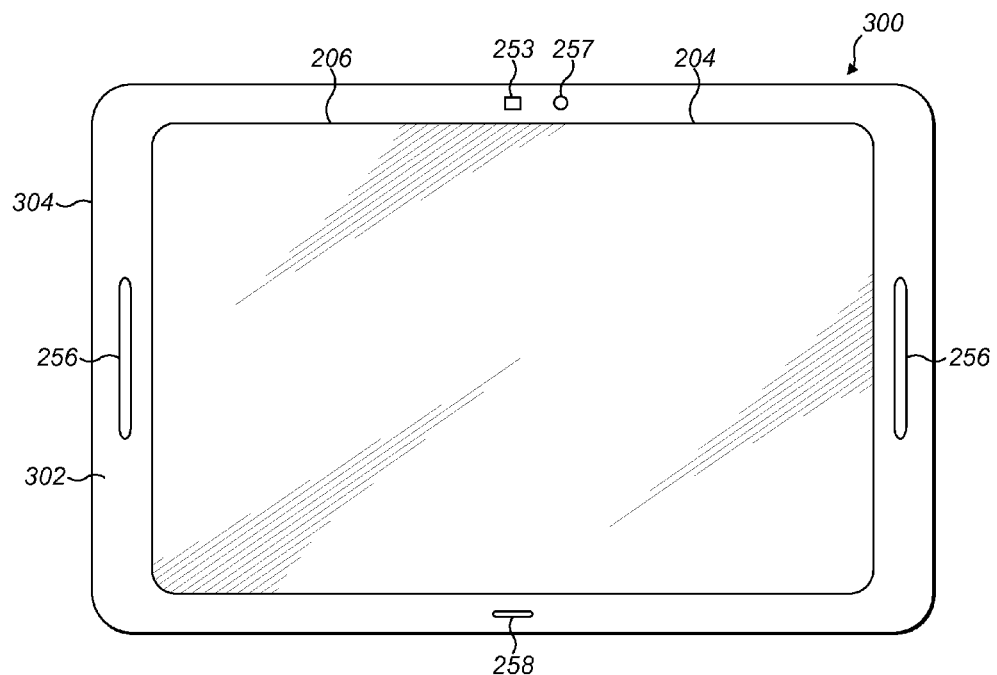
FIG. 3 is a front view of a tablet computer in accordance with example embodiments of the present disclosure.

Referring now to FIG. 3, a front view of another example of an electronic device 201, a tablet computer 300, is illustrated. The tablet computer 300 may include many of the same features and components of the phone 100 of FIG. 2. However, the tablet computer 300 of FIG. 3 is generally larger than the phone 100. The tablet computer 300 may include the components discussed above with reference to FIG. 1 or a subset of those components. The tablet computer 300 includes a housing 304 which houses at least some of the components discussed above with reference to FIG. 1. The tablet computer 300 could support cellular wireless communication and/or non-cellular wireless communication.

The tablet computer 300 includes a display 204, which may be a touchscreen display which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the example embodiment illustrated, the display 204 is framed by the housing 304.

The present disclosure relates to a method of providing a user control of a menu such that the menu can be displayed in two different configurations dependent on received user input. It is to be understood that the present disclosure relates to menus, without limitations to any particular type of menu. For example, the present disclosure is applicable to menu bars, sub-menus, popup menus, pull-down menus, pull-up menus, menu overflows, context menus, etc. The menus may contain one or more menu elements that may represent, for example, selectable menu functions or operations.

There will now be described two exemplary embodiments of the present disclosure, an 'action bar' overflow menu and a popup menu.

Action Bar System

Figure 4:
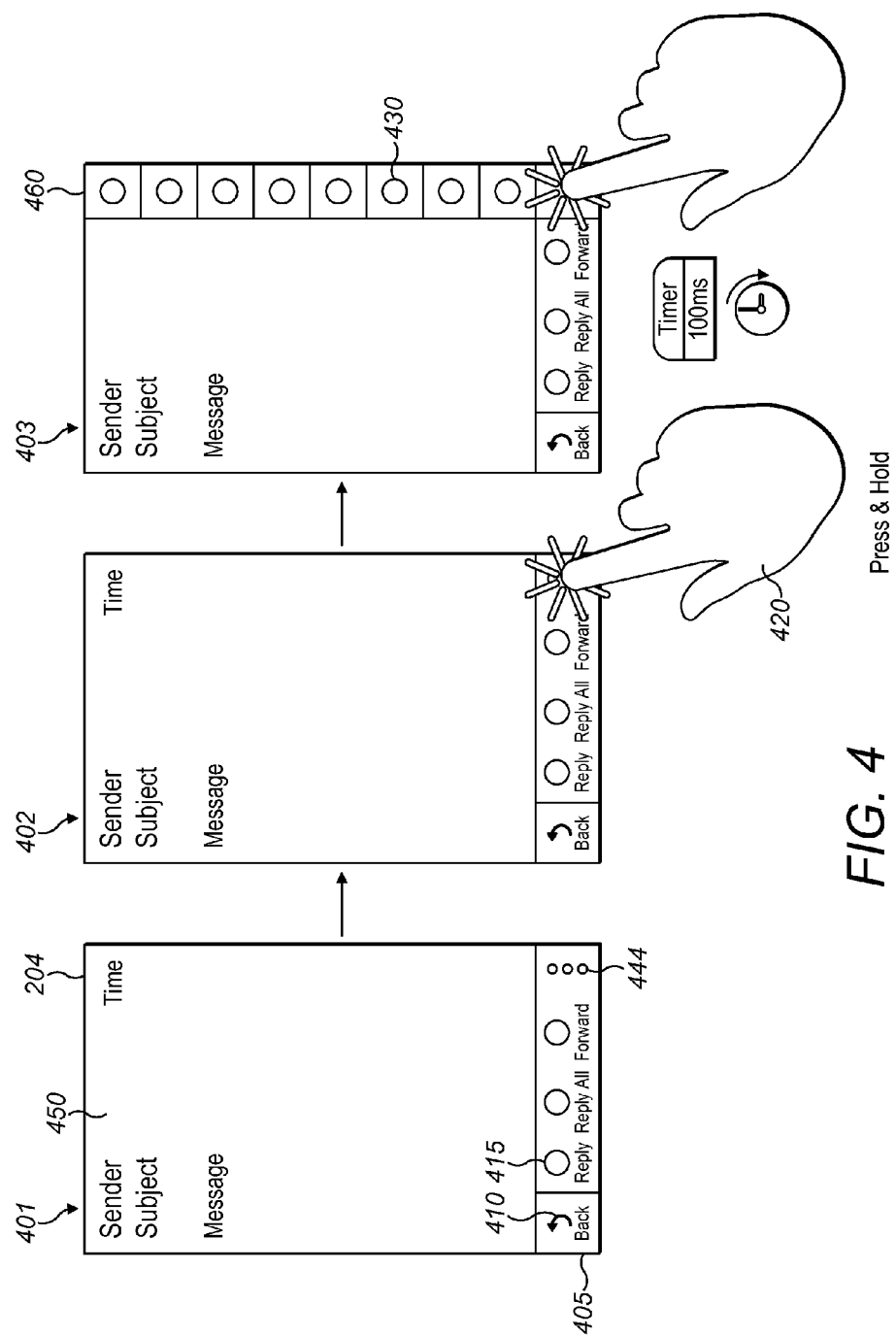
FIG. 4 illustrates an electronic device in accordance with an embodiment showing the use of a press gesture for displaying a function overflow menu.

Reference will now be made to FIG. 4 which illustrates a function menu 405, alternatively referred to herein as an 'action bar' on an electronic device 201. State 401 shows an application displayed on the display 204 of the electronic device 201, and in this example the application is an email application. An application may have a number of different display states it can display, associated with different aspects of the application. For example, an email application may have one display state for displaying all the emails in an inbox, and another display state for showing a single email and its contents. Each display state of an application may occupy a majority of the display 204 of the electronic device 201, and changing display state may significantly alter the display. Display states are often referred to as 'screens', 'views', 'windows' and 'graphical user interfaces' as changing the display state often involves changing the whole appearance of a screen.

In this example, the display state 450 shown is that of an email view, where the contents and information about a specific email is shown. Certain actions can be performed on the display state as a whole. Where the display state is primarily displaying a single content item, the actions that can be performed on the display state may relate to the content item it is primarily displaying. In this example, as the display state 450 is primarily displaying a single email, there may be actions that can be performed on this single email, such as 'reply', 'forward' and 'delete'. There may also be actions that can be directed to the application as a whole that may alter the display state, such as a 'back' button that would navigate the application away from the currently displayed display state to a display state previously displayed, or to a display state higher up in an application's hierarchy.

These actions may be provided to the user in a menu, in this case an action bar 405. The purpose of the action bar 405 is to provide a user with selectable menu operations and functions that can be performed in relation to the current display state or screen. As mentioned, selection of these menu functions can alter the display state itself (e.g. changing to a different display state), or can modify the content that the display state is representing. In this case the action bar 405 is different from many traditional toolbars as toolbars may provide actions that can be performed on individually selected items within a display state, screen or window, and depending on what content the user has selected within a specific display state, that toolbar action will be performed on that selected item. The actions of an action bar do not change based on what a user has selected within a display state, but only change depending on a change of display state itself.

In the example shown, the action bar 405 displays a number of selectable menu elements representing functions that can be performed on the display state 450. The menu elements may be displayed as icons like the 'back' icon 410. This 'back' icon represents the 'back' function that causes the display state to change to a previously presented display state. In this instance, the previous display state may have been the inbox display state from which the currently display email was listed, or a search result display state that listed the currently displayed email. The previously displayed state may have been a display state of a different application, such as the main operating system from which the user chose to access the currently displayed email. The 'reply' button 415 shows an example function that can be performed in relation to the content item being displayed in the current display state. In this case, selecting 'reply' allows a user to reply to the displayed email by switching to a new display state for composing the reply email. Other functions such as 'reply all', 'forward', 'delete' and 'mark unopened' may be possible functions to place in an action bar.

The action bar 405 in this example is shown spanning the bottom length of the display 204. In other examples, the action bar may be located at any other side of the screen of the electronic device or it may be at the side of an application window or some other virtual edge within the screen. The action bar may not be limited to being at any particular side, as it may be positioned at any conceivable edge of a physical or logical boundary and may change position depending on the display state. The action bar may also span more than one side of the device.

Only a subset of the functions available in menu 405 is displayed in step 401 in order to limit the use of the screen real estate. Instead, a user may gain access to the remaining, non-displayed functions in the menu 405 by providing user input to an overflow option 444 presented as an icon 444 in menu bar 405. In the embodiment in FIG. 4, a user can cause the remaining, non-displayed functions in the menu 405 to be displayed in overflow menu 460 by providing a first user input which in this example is pressing on the overflow option icon 444 for a duration exceeding a threshold time period. In this case, the threshold time period is very short, only 100 ms. Providing this user input by pressing on the display as shown in step 402 for a duration exceeding a threshold time period causes an overflow menu 460 to be displayed in a first, relatively small configuration containing only selectable representative icons 430 so as to project from the menu bar 405, and specifically from overflow option 444, to be display adjacent a side edge of display 204. The overflow menu 460 may pop up, extending upwards from the overflow option icon 444 and it may be the same width as the overflow option icon 444. Alternatively, it may slide in from the side, either displaying on top of the overflow option icon 444 or underneath it.

In other embodiments, the first user input may be only a press on the overflow option icon 444 without any requirement for exceeding a threshold time period. Where no threshold time period is required in the first user input, the overflow menu 460 may be displayed substantially immediately on receipt of the first user input in the form of a press on icon 444. The overflow menu 460 may be displayed by an animation of it appearing on screen.

Figure 5:
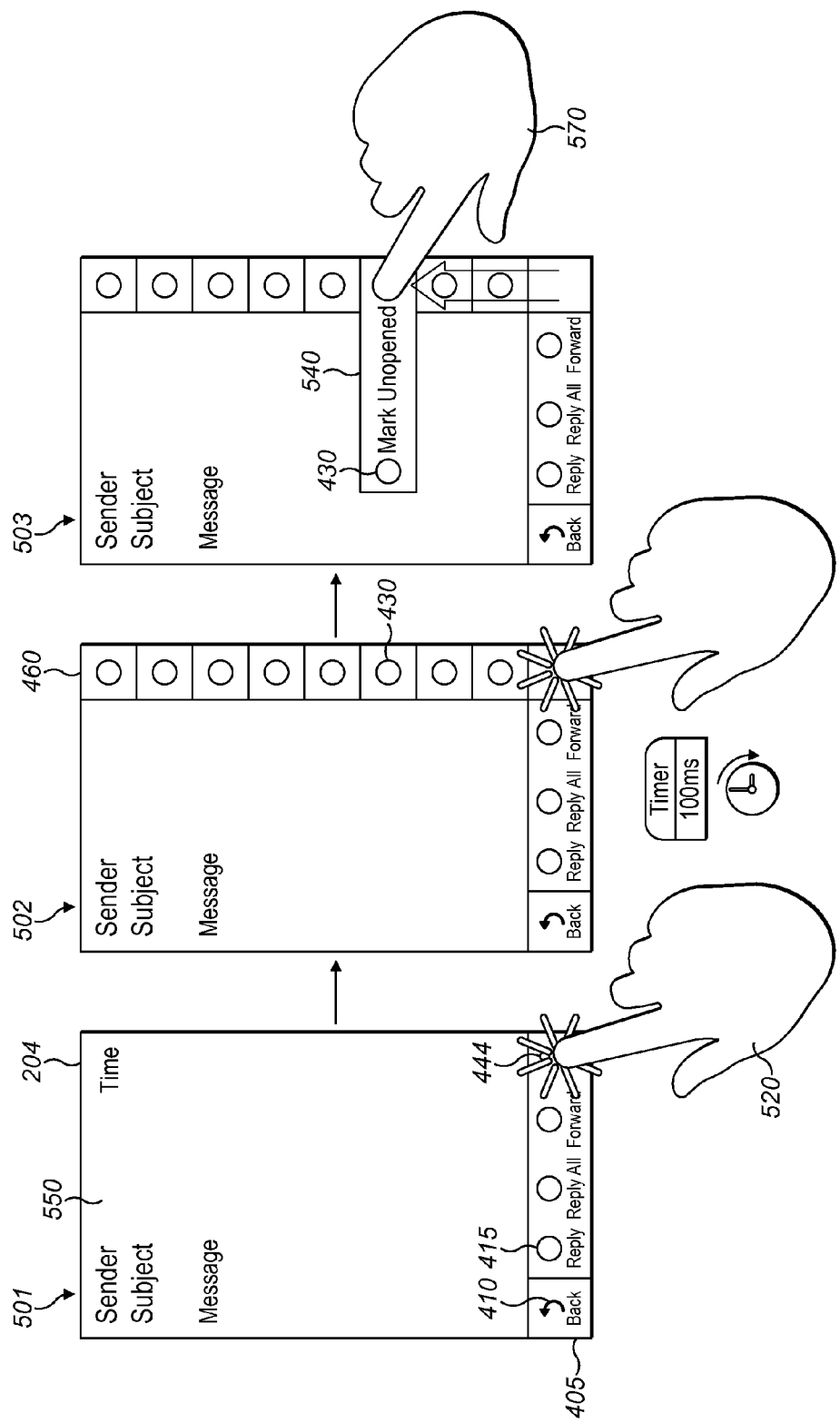
FIG. 5 illustrates an electronic device in accordance with an embodiment showing the use of a press and drag gesture for selecting a function from an overflow menu.

Referring to FIG. 5, which represents a continuation of the press shown in step 403 of FIG. 4, while the user is pressing on the overflow option icon 444 as in step 501 and after the overflow menu 460 has appeared in its first configuration as in step 502, the user can drag, swipe or scroll up the overflow menu 460 which may cause the icon of the pressed-on function 430 to be animated to project out from the overflow menu 460 into the display 204 to display also a text description of that function adjacent the representative icon (see step 503). On dragging the press off that icon would cause that icon to contract back from its projected state. On performing a release of the dragged press over any function represented by an icon in the overflow menu causes the device to attempt to carry out that function in respect of the display state 550 of the graphical user interface of the application. In step 503 of FIG. 5, releasing the press on the 'mark unopened' function would cause the email displayed in display state 550 to be marked unopened. Releasing the press outside of the overflow menu 460 causes the overflow menu to be dismissed.

For an advanced user, this interaction with the function menu 405 allows the user to, in one movement, touch on the overflow option icon 444 to quickly display the overflow menu 460 in a first, relatively small configuration, drag their finger up to the desired action 430 and then release over the icon to cause the action to be carried out. This selection of a menu function is thus achieved smoothly and efficiently using only minimal screen real estate and fewer user interactions.

Figure 6:
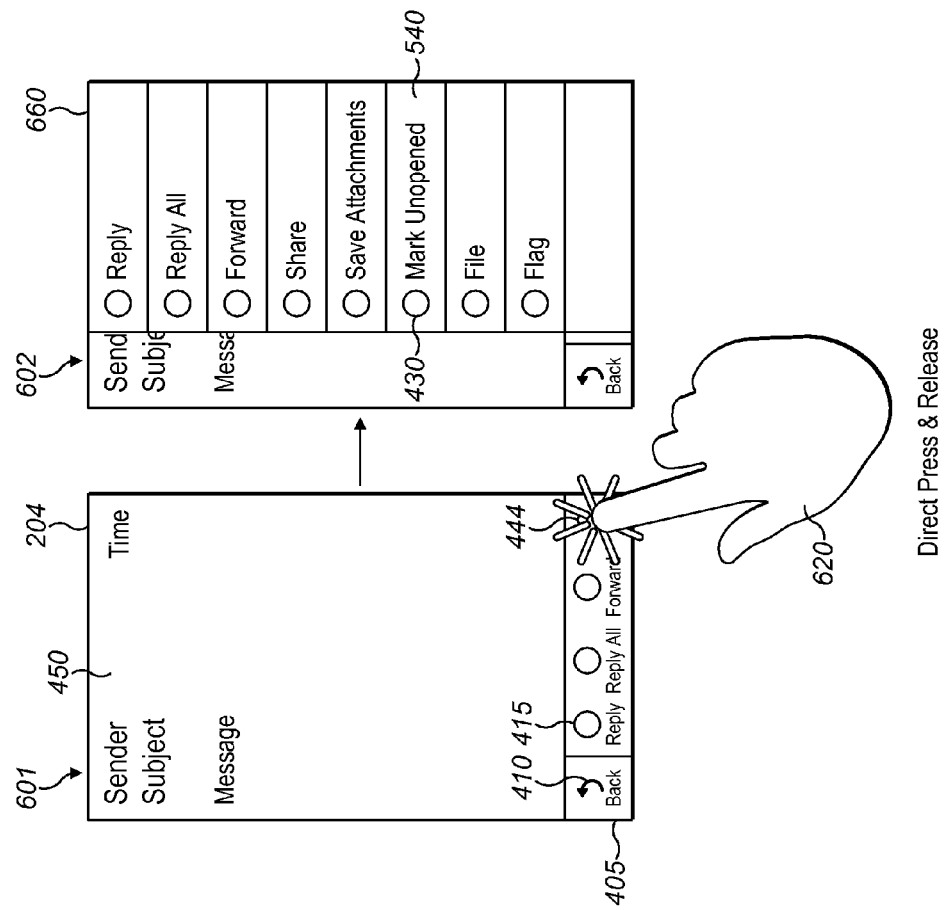
FIG. 6 illustrates an electronic device in accordance with an embodiment showing the use of a press and drag gesture for displaying a function overflow menu.

Returning back to step 403 of FIG. 4, rather than dragging up the overflow menu 460 as shown in FIG. 5, a user may instead perform a second user input continuous from said first user input to cause the menu to be displayed in a different, second configuration. In this case the second user input may be a release of the press on of the overflow option icon 444. This is illustrated in FIG. 6. The second user input, continuous with the first user input (in this case the release, shown in step 601) may be performed immediately after performing the initial press on the icon 444 (e.g. before the duration of the threshold time value has elapsed), or the release may occur a period of time after the initial touch was made (e.g. after the duration of the threshold time value has elapsed). On performing the release over the overflow option icon 444 (and as long as a release hasn't already been performed on a different part of the screen), the overflow menu 460 will extend out to be displayed in a second, relatively large configuration (see step 602), in which, for example, a text description 540 of each function may be displayed adjacent the representative icon 430 for that function.

Once this enlarged overflow menu 660 is displayed, a user can tap on one of the enlarged icons to perform the function associated with it. To dismiss the overflow menu 660, the user can tap outside of the menu, or tap on the overflow option icon 444 again, or the user could swipe the overflow menu 660 to the edge of the screen, in this case to the right.

Figure 7:
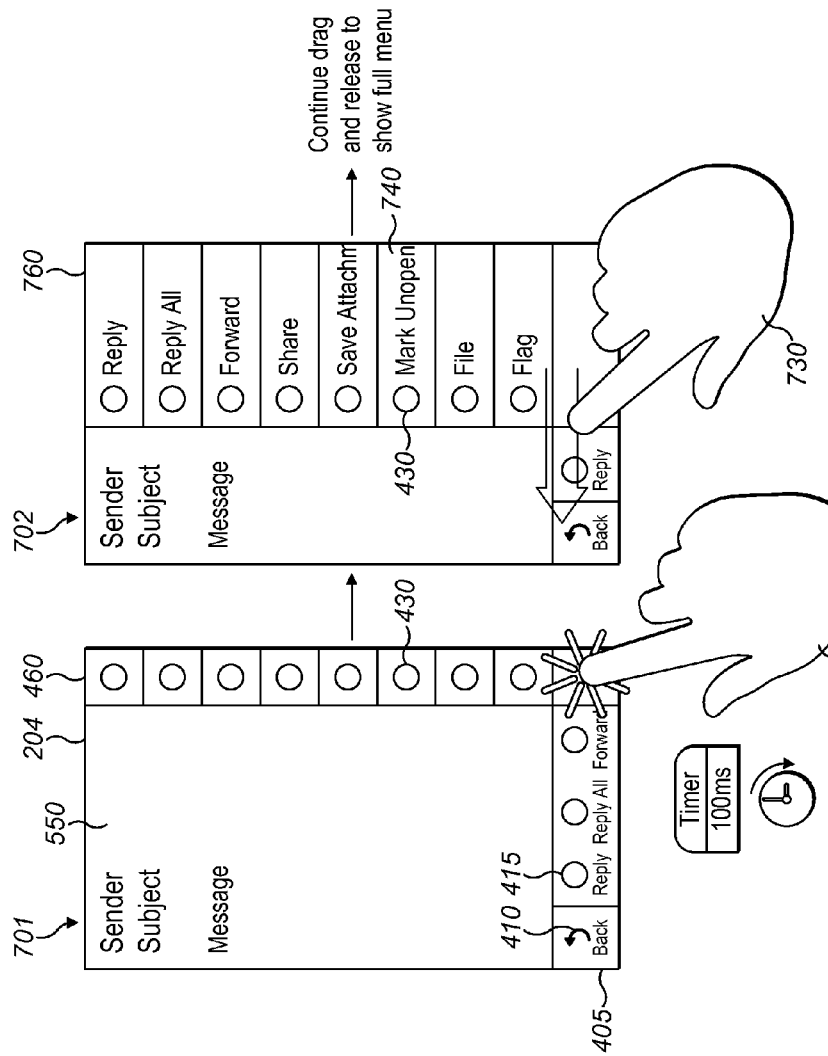
FIG. 7 illustrates an electronic device in accordance with an embodiment showing the use of a press and release gesture for displaying a function overflow menu.

A further mode of interaction with the menu 405 in accordance with another embodiment by which a user can expand the display of the overflow menu 460 from the first, relatively small configuration to the second, relatively large configuration 760 is illustrated in FIG. 7. In this mode of interaction, the user provides a different, second user input continuous with the first user input by performing a swipe from the press of the overflow menu 460 out away from the edge of the display 204 such that the overflow menu expands out with the user's swipe from its first, relatively small configuration to the second, relatively large configuration 760. The animation may be continuous and reversible in accordance with the swipe gesture.

Other user interactions may be received between said first user input and said second user input, as long as the second user input is continuous from said first user input. For example, after performing the press on icon 444 such that the overflow menu 460 is displayed in the first relatively small configuration, the user may drag up and down on the overflow menu 460 to preview the menu options. The user may then return to the position of the initial press on icon 444 and swipe out to cause the overflow menu 460 to be displayed in the second, relatively large configuration. Alternatively, the user may not need to return the press to the initial position of the press on icon 444 and may instead swipe the overflow menu out into its enlarged second configuration, starting from any position on the overflow menu 460.

In some embodiments, at least one function of the set of functions in the menu 405 is displayed in said overflow menu only when the overflow menu is displayed in the second, relatively large configuration. For example, a delete function in the overflow menu may not appear when the overflow menu appears in the first, relatively small configuration, but instead may only appear after the overflow menu is displayed in the second, relatively large configuration. In other words, the user must have pressed and released on the overflow option icon before a delete function is shown. The user can then press the delete function to trigger a delete. This reduces the likelihood of accidentally causing a deletion as it requires two sets of touches and releases. The delete function icon may appear at the bottom right of the screen in the second display configuration of the overflow menu, on top of where the overflow option icon was.

In some embodiments, some or all of the functions displayed in the menu 405 in step 401 may also be represented in the overflow menu. If more functions are provided in the overflow menu than can be displayed on the screen the user may scroll through the functions by dragging to the top or bottom of the overflow menu.

The above proposed solutions allow a user interface to be provided that facilitates a user interaction with a function menu in an efficient manner while having a low usage of screen real estate.

In the examples provided above, the display state is directed to an email application. However, the proposed solutions are envisioned to be used in any display state for any application. For example, the application may be the operating system itself, with the display state being the home screen. The action bar associated with such a home screen would provide actions related to the home screen such as an 'organise' button for rearranging content on the home screen, or a 'settings' button for altering changing the display state to show the settings display state of the operating system.

Popup Menu

While the examples provided above relate to overflow menus extending from action bars, there are a number of other possible uses of the proposed solution. One example is the activation of a generic popup displaying a sub-menu.

Figure 8:
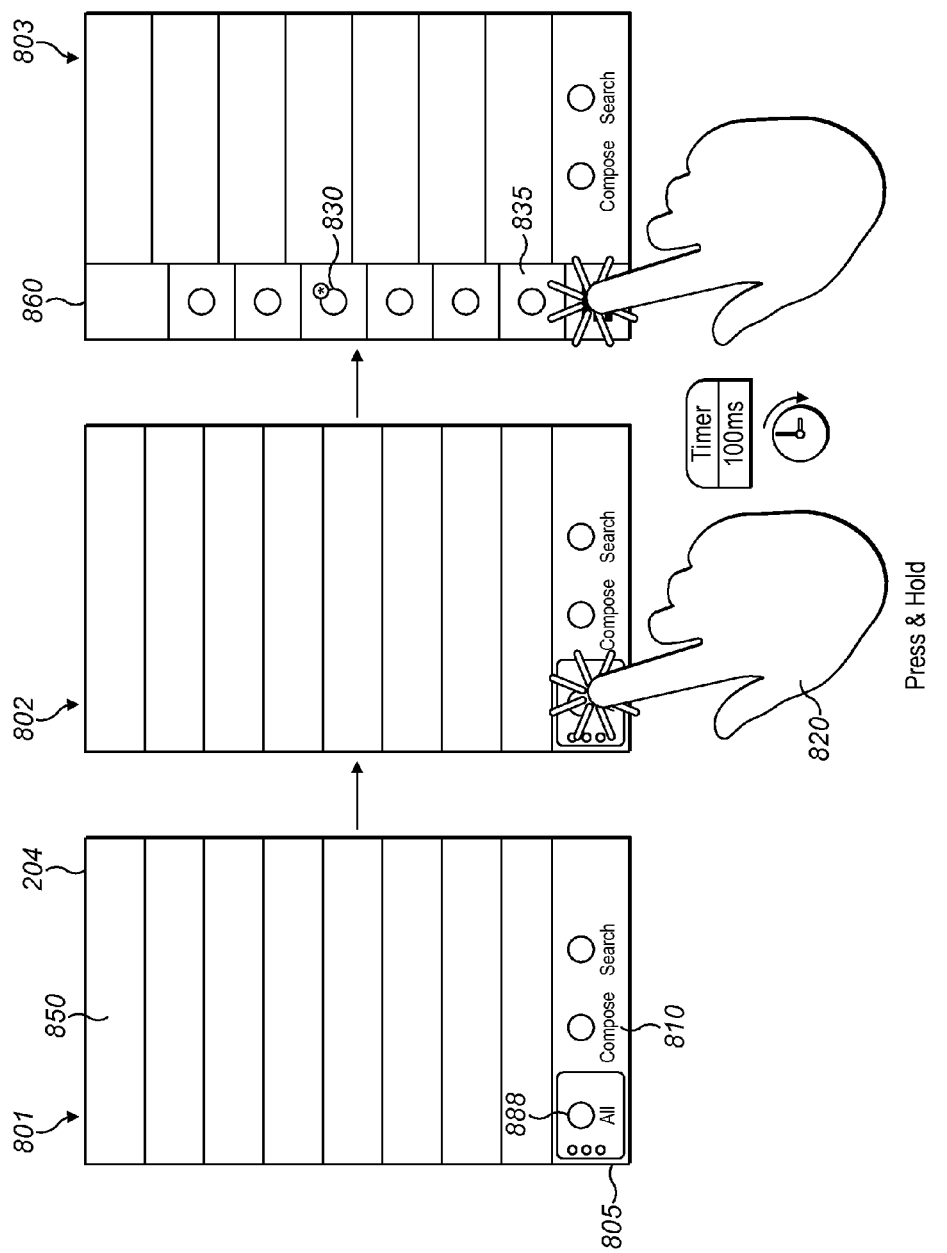
FIG. 8 illustrates an electronic device in accordance with an embodiment showing the use of a press gesture for displaying a function popup menu.

Reference will now be made to FIG. 8 which illustrates a function menu 805, on an electronic device 201. State 801 shows an application displayed on the display 204 of the electronic device 201, and in this example the application is one displaying a list of content 850.

Along the action bar 805 there are icons that can be selected such as the Compose 810 icon, 'Search' icon and 'All' filter icon 888. The Compose 810 icon, when pressed, causes a new window to open to create a new document, while pressing on the Search icon causes a search window to appear. The 'All' icon, indicates to the user what filter is currently being applied to the displayed list 850. Should a user wish to change the filter currently being applied they would need to access a sub-menu, or dropdown menu that enables them to change the filter to a different one. Therefore, rather than an overflow option, this embodiment discloses the activation of a sub-menu or popup menu. The mode of user interaction with the popup menu is, in this case, identical to that described above in relation to the overflow menu 460. Nevertheless, a detailed description thereof will now be provided.

In the embodiment in FIG. 8, a user can cause the popup menu to be displayed by providing a first user input to the device, which in this case is by pressing on the filter icon 888 for a duration exceeding a threshold time period. Providing this user input by pressing on the display as shown in step 802 for a duration exceeding a threshold time period causes a popup menu 860 to be displayed in a first, relatively small configuration containing only selectable representative icons 830 indicating the different filters available. These icons 830 are displayed as projecting from the menu bar 805, and specifically from original filter button 888. The popup menu 860 may pop up, extending upwards from the filter icon 888 and it may be the same width as the filter icon 888. Alternatively, it may slide in from the side, either displaying on top of the filter icon 888 or underneath it. Of course, the first user input may instead be only a press on the filter icon 888 with no threshold time period.

Figure 9:
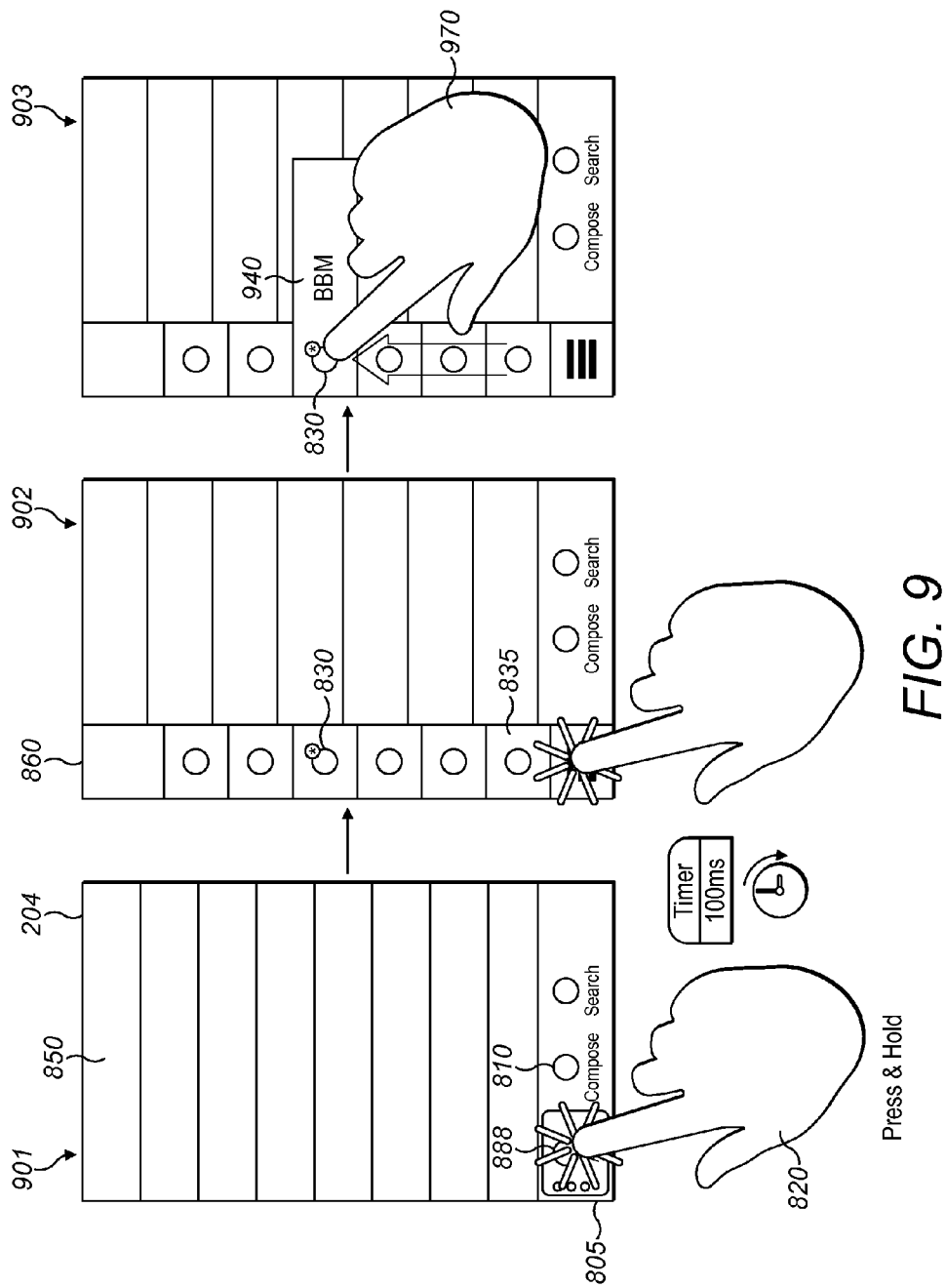
FIG. 9 illustrates an electronic device in accordance with an embodiment showing the use of a press and drag gesture for selecting a filter from a popup menu.

Referring to FIG. 9, which represents a continuation of the press shown in step 803 of FIG. 8, while the user is pressing on the filter icon 888 as in step 901 and after the popup menu 860 has appeared as in step 902, the user can drag up the popup menu 860 which may cause the icon of the pressed-on filter option 830 to be animated to project out from the popup menu 860 into the display 204 to display also a text description 940 of that filter adjacent the representative icon (see step 903). On dragging the press off that icon would cause that icon to contract back from its projected state. On performing a release of the dragged press over any filters represented by an icon in the popup menu causes the device to attempt to carry out that filter in respect of the displayed list 850 of the graphical user interface of the application. In step 903 of FIG. 9, releasing the press on the 'BBM' filter icon would cause the displayed list 850 to change so as to only show items had an attribute labelled 'BBM'. For example, where the application is a messaging client and the list 850 is a list of all messaged received at the device, a user may wish to only view messages originating from Blackberry™ Messenger (BBM™). Releasing the press outside of the popup menu 860 causes the popup menu to be dismissed.

For an advanced user, this interaction with the popup menu 805 allows the user to, in one movement, touch on the filter icon 888 to quickly display the popup menu 860, drag their finger up to the desired filter 830 and then release over the icon to cause the filter to be applied. This is achieved smoothly and efficiently using only minimal screen real estate.

Figure 10:
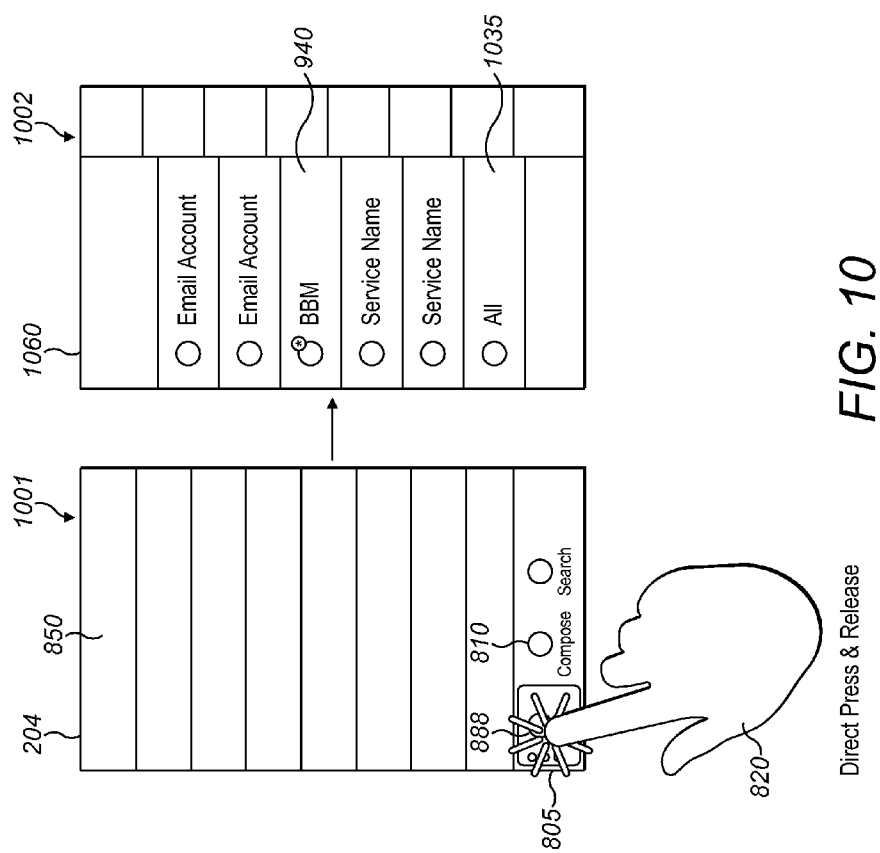
FIG. 10 illustrates an electronic device in accordance with an embodiment showing the use of a press and drag gesture for displaying a popup menu.

Returning back to step 803 of FIG. 8, rather than dragging up the popup menu 860 as shown in FIG. 9, a user may instead provide a second user input continuous from the first, in this case in the form of a release of the press on the filter icon 888 to cause the popup menu 805 to be displayed in a second configuration. This is illustrated in FIG. 10. This release, shown in step 1001, may be substantially immediately after performing the initial press on the icon 888 (i.e. before the duration of the threshold time value has elapsed), or the release may occur a period of time after the initial touch was made (i.e. after the duration of the threshold time value has elapsed). On performing the release over the filter icon 888 (and as long as a release hasn't already been performed on a different part of the screen), the popup menu 860 will extend out to be displayed in a second, relatively large configuration 1035 (see step 1002), in which, for example, a text description 940 of each filter may be displayed adjacent or in place of the representative icon 830 for that filter.

Once this enlarged popup menu 1035 is displayed, a user can tap on one of the enlarged icons to apply the filter associated with it. To dismiss the popup menu 1035, the user can tap outside of the menu, or tap on the filter icon 888 again, or the user could swipe the popup menu 1035 to the edge of the screen, in this case to the left.

Embodiments have been described herein by way of example and these embodiments are not intended to be limiting. Rather, it is contemplated that some embodiments may be subject to variation or modification without departing from the spirit and scope of the disclosed solutions.

For example, while the above described embodiments often involve performing a press on a touch screen on an icon, the proposed solution can be used with a variety of user inputs. For example, rather than a press on a touchscreen, the first user input could be a right click of the mouse, with the second user input being the release of the right click, thereby providing two possible configurations of the menu easily accessible to the user. These user inputs need to be directed at any icon in particular and the electronic device could be configured to receive a user input at any location and display a menu accordingly.

Other possible examples include the first user input could be the detection, for example, by using a camera, of an off-surface gesture where the user points into an icon displayed on a screen in the distance, and the second user input is to move the point further away or retract from the icon, in other words the opposite or converse action of pointing into the icon. It may be preferable for the second user input to be the converse, opposite, reverse or inverse of the first user input, as this would be a natural and intuitive second input the user would provide once performing the first user input. The user input could also be a physical key press, for example holding down an a start menu key could display a quick-access menu for advanced users, while releasing the start menu key could result in a larger, expanded menu. A track pad or scroll wheel could also be used to detect a first user input of a press, and a second user input of a release. The track pad or scroll wheel can also be used to allow the user to scroll or direct selection to one of the menu elements either when the menu is in a first configuration, or in a second configuration.

As can be seen, there are many possible user inputs that can be envisaged to use the proposed solution, all of which receiving the same benefit of providing a quick and intuitive way of providing multiple user interfaces to a user depending on how they initiate it.

It is to be understood that the present disclosure includes all permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

What is claimed is:

1. A method, at an electronic device comprising a touch-sensitive display, the method comprising:
    on receiving a touch for a period longer than a predetermined threshold on an icon displayed on a menu on the display, displaying the menu in a first extended configuration, the menu in the first extended configuration extending linearly from the icon and having menu elements including representative icons of operations associated with the menu elements;
    detecting dragging of the touch across icons in the menu in the first extended configuration to a specific icon associated with a menu element; and
    on receiving a release of a touch on the specific icon, displaying the menu in a second extended configuration with a portion extending from the specific icon, wherein the menu element in the first extended configuration is represented in the menu in the second extended configuration with additional description of the operation associated with the menu element.

2. A method as claimed in claim 1, wherein at least one of the one or more menu elements are selectable to carry out an operation.

3. A method as claimed in claim 2, wherein said operation is performed in relation to an application having a graphical user interface displayed on the display.

4. A method as claimed in claim 1, wherein the menu elements in the menu in the second extended configuration comprise descriptions of operations associated with the menu elements.

5. A method as claimed in claim 1, wherein the menu in the first extended configuration is smaller than the menu in the second extended configuration.

6. A method as claimed in claim 1, wherein the menu in at least one of the extended configurations is displayed projecting from said icon displayed on the display.

7. A method as claimed in claim 1, wherein the menu in at least one of the extended configurations is scrollable to display additional menu elements in response to receipt of user input.

8. A method as claimed in claim 1, wherein while the menu in the first extended configuration is displayed, further comprising receiving a user input selecting one of said menu elements and carrying out the operation associated with said menu element.

9. A method as claimed in claim 8, wherein the user input selecting one of said menu elements is continuous from the touch on the icon.

10. A method as claimed in claim 8, wherein the user input selecting one of said menu elements is a touch and release on the menu element.

11. A method as claimed in claim 8, wherein upon receiving the user input selecting one of said menu elements, displaying an indication that the selected menu element has been selected.

12. A method as claimed in claim 8, further comprising receiving a user input directed to one of said menu elements and displaying said menu element in an expanded form.

13. A method as claimed in claim 8, further comprising, while displaying the menu in the first extended configuration, on detecting a movement of the touch away from the menu, displaying the menu in the second extended configuration.

14. A method as claimed in claim 1, further comprising receiving an intermediate user input continuous from the touch and continuous to the release.

15. An electronic device comprising:
a touch-sensitive display;
one or more processors; and
memory comprising instructions which when executed by one or more of the processors cause the device to:
on receiving a touch for a period longer than a predetermined threshold on an icon displayed on a menu on the display, displaying the menu in a first extended configuration, the menu in the first extended configuration extending linearly from the icon and having menu elements including representative icons of operations associated with the menu elements;
detecting dragging of the touch across icons in the menu in the first extended configuration to a specific icon associated with a menu element; and
on receiving a release of a touch on the specific icon, displaying the menu in a second extended configuration with a portion extending from the specific icon, wherein the menu element in the first extended configuration is represented in the menu in the second extended configuration with additional description of the operation associated with the menu element.

16. A method of claim 5, wherein the menu in the first extended configuration has a smaller width than the menu in the second extended configuration.

17. A method of claim 5, wherein the menu in the first extended configuration has fewer menu elements than the menu in the second extended configuration.

18. A method as claimed in claim 1, wherein when the menu is displayed in at least one of the first extended configuration and the second extended configuration, ceasing to display said touched icon.

19. A method as claimed in claim 1, wherein at least one element of the menu in the second extended configuration is not represented in the menu in the first extended configuration.

20. An electronic device comprising:
a touch-sensitive display;
one or more processors; and
memory comprising instructions which when executed by one or more of the processors cause the device to:
display a first menu on the touch-sensitive display, the first menu comprising menu elements upon detection of a long press on an icon and the first menu linearly extends from the icon, wherein while the first menu is displayed:
upon detection of a release of said long press on the icon, display a second menu comprising menu elements to replace the first menu;
upon detection of a swipe gesture, display the second menu to replace the first menu; and
upon detection of a swipe gesture continuous from said long press on the icon to one of the menu elements displayed on the first menu, expand the one menu element to display additional information about the one menu element; and,
display a second menu upon detection of a tap gesture on the icon;
on receiving a touch for a period longer than a predetermined threshold on an icon displayed on a menu on the display, displaying the menu in a first extended configuration, the menu in the first extended configuration extending linearly from the icon and having menu elements including representative icons of operations associated with the menu elements;
detecting dragging of the touch across icons in the menu in the first extended configuration to a specific icon associated with a menu element; and
on receiving a release of a touch on the specific icon, displaying the menu in a second extended configuration with a portion extending from the specific icon, wherein the menu element in the first extended configuration is represented in the menu in the second extended configuration with additional description of the operation associated with the menu element.

21. The electronic device as claimed in claim 20, wherein at least one of the menu elements are selectable to carry out an operation.

22. The electronic device as claimed in claim 20, wherein the menu elements in the second menu comprise descriptions of operations associated with the menu elements.

23. The electronic device as claimed in claim 20, wherein the first menu is smaller than the menu in the second menu.

24. The electronic device as claimed in claim 23, wherein the first menu has fewer menu elements than the second menu.

25. The electronic device as claimed in claim 20, wherein at least one of the first menu and second menu is scrollable to display additional menu elements in response to receipt of user input.

26. The electronic device as claimed in claim 20, wherein said icon is not displayed in at least one of the first menu and second menu.

27. The electronic device as claimed in claim 20, wherein at least one menu element of the second menu is not represented in any menu elements in the first menu.

* * * * *